United States Patent
Kim et al.

(10) Patent No.: US 10,442,929 B2
(45) Date of Patent: Oct. 15, 2019

(54) ASPHALT MODIFIER AND ASPHALT COMPOSITION COMPRISING THE SAME

(71) Applicant: LG Chem, Ltd., Seoul (KR)

(72) Inventors: Tae Jung Kim, Daejeon (KR); Chun Hwa Lee, Daejeon (KR); Hye Rim Lee, Daejeon (KR)

(73) Assignee: LG Chem, Ltd. (KR)

( * ) Notice: Subject to any disclaimer, the term of this patent is extended or adjusted under 35 U.S.C. 154(b) by 26 days.

(21) Appl. No.: 15/743,521

(22) PCT Filed: Dec. 22, 2016

(86) PCT No.: PCT/KR2016/015092
§ 371 (c)(1),
(2) Date: Jan. 10, 2018

(87) PCT Pub. No.: WO2018/074662
PCT Pub. Date: Apr. 26, 2018

(65) Prior Publication Data
US 2019/0077962 A1 Mar. 14, 2019

(30) Foreign Application Priority Data

Oct. 21, 2016 (KR) .................. 10-2016-0137691

(51) Int. Cl.
*C08L 95/00* (2006.01)
*C08F 236/10* (2006.01)
*C08K 5/54* (2006.01)

(52) U.S. Cl.
CPC ............ *C08L 95/00* (2013.01); *C08F 236/10* (2013.01); *C08K 5/5406* (2013.01); *C08L 2555/60* (2013.01); *C08L 2555/84* (2013.01)

(58) Field of Classification Search
None
See application file for complete search history.

(56) References Cited

U.S. PATENT DOCUMENTS

| 6,150,439 | A | 11/2000 | Keiichi et al. |
| 10,189,995 | B2 | 1/2019 | Nakajima et al. |
| 2004/0081820 | A1 | 4/2004 | Hayashi et al. |
| 2006/0229391 | A1* | 10/2006 | Torii ............... C08F 297/04 524/64 |
| 2010/0105813 | A1 | 4/2010 | Wissel et al. |
| 2011/0034595 | A1 | 2/2011 | Chun et al. |
| 2014/0066549 | A1 | 3/2014 | Wissel et al. |
| 2016/0326371 | A1* | 11/2016 | Seo ............... C08F 297/044 |

FOREIGN PATENT DOCUMENTS

| CN | 105238081 A | 1/2016 |
| CN | 105274842 A | 1/2016 |
| JP | S62149685 A | 7/1987 |
| JP | H09227734 A | 9/1997 |
| JP | 2001072796 A | 3/2001 |
| JP | 2004292789 A | 10/2004 |
| JP | 4069389 B2 | 4/2008 |
| JP | 4178375 B2 | 11/2008 |
| JP | 4623246 B2 | 2/2011 |
| JP | 2016065239 A | 4/2016 |
| KR | 100315724 B1 | 12/2001 |
| KR | 20130045305 A | 5/2013 |
| KR | 20150037452 A | 4/2015 |
| KR | 101551002 B1 | 9/2015 |
| KR | 20150102869 A | 9/2015 |
| KR | 20150129058 A | 11/2015 |
| KR | 20160052310 A | 5/2016 |
| WO | 2009154251 A1 | 12/2009 |
| WO | 2015170739 A1 | 11/2015 |
| WO | WO-2016072584 A1 * | 5/2016 ......... C08F 297/044 |

OTHER PUBLICATIONS

Search report from International Application No. PCT/KR2016/015092, dated Jul. 17, 2017.

* cited by examiner

*Primary Examiner* — Christopher M Rodd
(74) *Attorney, Agent, or Firm* — Lerner, David, Littenberg, Krumholz & Mentlik, LLP

(57) ABSTRACT

The present invention relates to an asphalt modifier including a main chain of a vinyl aromatic hydrocarbon-conjugated diene block copolymer, and more particularly, to an asphalt modifier capable of effectively improving low-temperature properties, high-temperature properties, storage stability, and the like of an asphalt composition due to excellent compatibility with the asphalt composition when a vinyl aromatic hydrocarbon-conjugated diene block copolymer containing a certain multifunctional group is used as the asphalt modifier, and an asphalt composition including the same.

7 Claims, No Drawings

ASPHALT MODIFIER AND ASPHALT COMPOSITION COMPRISING THE SAME

CROSS-REFERENCE TO RELATED APPLICATIONS

The present application is a national phase entry under 35 U.S.C. § 371 of International Application No. PCT/KR2016/015092 filed on Dec. 22, 2016, which claims priority from Korean Patent Application No. 10-2016-0137691, filed on Oct. 21, 2016 with the Korean Intellectual Property Office, the disclosures of which are herein incorporated by reference in its entirety.

TECHNICAL FIELD

The present invention relates to an asphalt modifier having high solubility and an asphalt composition including the same.

BACKGROUND ART

Asphalt is a residue which is obtained after most of volatile oils in components of crude oil are evaporated, and has a physical property of being maintained in a liquid or semi-solid state having a high viscosity at a high temperature but being firmly hardened at a temperature less than or equal to room temperature.

Because the asphalt has good plasticity, high water repellency, electrical insulating properties and adhesiveness, and chemically stable characteristics, the asphalt has been widely used for construction materials such as paving materials or waterproof materials. However, the asphalt has drawbacks in that plastic deformation occurs during use when the asphalt is exposed to a high temperature for a prolonged period of time and cracking occurs at a low temperature due to external impacts. In order to solve the above problems, research has been conducted to improve the physical properties of asphalt by adding various polymers.

Specifically, a vinyl aromatic hydrocarbon-conjugated diene block copolymer such as a styrene-butadiene-styrene (SBS) block copolymer has been widely used as a modifier for improving the physical properties of asphalt.

When the vinyl aromatic hydrocarbon-conjugated diene block copolymer is used as the asphalt modifier, much time and cost are required to dissolve the block copolymer at a high temperature. Therefore, the most important physical property of the block copolymer used as the asphalt modifier is compatibility with asphalt.

However, as advancement of oil refining facilities has been continuously made due to an increase in oil prices and energy saving policy, the amount of asphaltene in asphalt, as a refining byproduct, has been increased. Because the asphaltene as an aggregate of aromatic hydrocarbons, includes a large amount of polar functional groups at the ends thereof, the asphaltene has very low compatibility with block copolymers having no hydrophilic functional groups. Thus, a processing time or a manufacturing time of the asphalt may not only be remarkably extended, but a decline in quality of the asphalt, for example, a decrease in elasticity of modified asphalt, may also be caused.

Accordingly, various studies on a method of adjusting a molecular weight of the SBS block copolymer or changing a microstructure of the SBS block copolymer to provide a coupling effect, or a method of adding an additive, such as oil, as a processing aid have been conducted to enhance the compatibility with the asphalt.

By way of example, Korean Patent Publication No. 2016-0052310 discloses that compatibility with the asphalt and physical properties of the asphalt may be improved when a vinyl aromatic hydrocarbon-conjugated diene block copolymer including a predetermined content of a heterologous conjugated diene block having a peak molecular weight Mp is used as an asphalt modifier.

Also, Korean Patent Publication No. 2015-0102869 discloses that modification workability, low-temperature properties and storage stability of the asphalt may be improved when a functionalized vinyl aromatic hydrocarbon-conjugated diene block copolymer in which an aldehyde group is bound to a main chain of a conjugated diene block is used as an asphalt modifier.

Such patents have somewhat improved mixing property with the asphalt, but do not exhibit a sufficient improvement effect. Also, the patents have no ultimate solution because there is a high variation in quality of asphalt and asphalt compositions obtained accordingly also have different modification effects. Thus, there is an urgent need for research on a vinyl aromatic hydrocarbon-conjugated diene block copolymer having excellent compatibility and modifying performance as the asphalt modifier.

PRIOR-ART DOCUMENTS

[Patent Documents]
Korean Patent Publication No. 2016-0052310 (May 12, 2016), "Asphalt Modifier and Asphalt Composition Comprising the Same"
Korean Patent Publication No. 2015-0102869 (Sep. 8, 2015), "Functionalized Vinyl Aromatic Hydrocarbon-Conjugated Diene Block Copolymer Composition, Method of Preparing the Same and Asphalt Composition Comprising the Same"

DISCLOSURE

Technical Problem

Accordingly, the present inventors have conducted research on a method of improving solubility of an asphalt modifier without changing a molecular microstructure of an SBS copolymer as a conventional modifier, and found that solubility in asphalt may be remarkably improved only by introducing a silane group containing an alkyl group as a coupling agent into an end of the SBS copolymer. Therefore, the present invention has been completed based on the facts.

Accordingly, it is an aspect of the present invention to provide an asphalt modifier having a novel structure.

It is another aspect of the present invention to provide an asphalt composition including the asphalt modifier.

Technical Solution

To solve the above problems, according to an aspect of the present invention, there is provided an asphalt modifier which is represented by the following Formula 1 and comprises a multifunctional group bound to a main chain of a vinyl aromatic hydrocarbon-conjugated diene block copolymer:

[Formula 1]

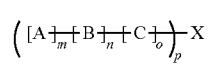

wherein A, B, C, X, m, n, o, and p are as described in this specification.

According to another aspect of the present invention, there is provided an asphalt composition including the asphalt modifier.

Advantageous Effects

The asphalt modifier according to the present invention has excellent compatibility with asphalt as a certain multifunctional group is introduced into a vinyl aromatic hydrocarbon-conjugated diene block copolymer. Thus, when the asphalt modifier is used in an asphalt composition, workability can be remarkably improved, and various physical properties of asphalt, such as low-temperature and high-temperature properties, storage stability, and the like, can be effectively improved.

BEST MODE

Hereinafter, the present invention will be described in further detail.

The terms and/or words used in this specification and the appended claims are not to be interpreted as limited to commonly used meanings or meanings in dictionaries and should be interpreted with meanings and concepts which are consistent with the technological scope of the present invention based on the principle that the present inventors have appropriately defined concepts of terms to describe the present invention in the best way.

To improve physical properties of an asphalt composition, a vinyl aromatic hydrocarbon-conjugated diene block copolymer is used as an asphalt modifier.

The asphalt composition is mainly composed of four components. Among these, a component having the worst compatibility with a vinyl aromatic hydrocarbon-conjugated diene block copolymer used as the asphalt modifier is asphaltene. Asphaltene is a highly concentrated aromatic hydrocarbon compound including polar functional groups having a number of heteroatoms in a chemical aspect. However, because the vinyl aromatic hydrocarbon-conjugated diene block copolymer used as the asphalt modifier contains no polar functional groups, the asphalt modifier has poor compatibility with an asphalt composition, resulting in degraded processability and workability. Also, the asphalt modifier is not sufficiently mixed with the asphalt composition, resulting in degraded quality, such as degraded elasticity, of asphalt.

To solve the above problems, a method of adjusting a molecular weight of a block copolymer or a method of adding a hydrophilic monomer, oil, and the like has been used in the related art. However, such a method has a drawback in that the molecular weight of the block copolymer may decrease due to cleavage of chains thereof, and thus the physical properties of the asphalt composition may be rather degraded.

Accordingly, in the present invention, there is provided an asphalt modifier including a vinyl aromatic hydrocarbon-conjugated diene block copolymer into which a certain multifunctional group is introduced to secure excellent compatibility when mixed in the asphalt composition.

Specifically, the asphalt modifier according to the present invention may include a main chain of a vinyl aromatic hydrocarbon-conjugated diene block copolymer and a multifunctional group bound to the main chain of the vinyl aromatic hydrocarbon-conjugated diene block copolymer, and may be represented by the following Formula 1:

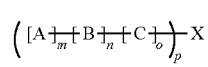
[Formula 1]

wherein A to C blocks are each independently a vinyl aromatic hydrocarbon block or a conjugated diene block, X is represented by the following Formula 2, m, n, and o are each an integer greater than or equal to 1, and p is an integer in a range of $0 < p \leq 3$;

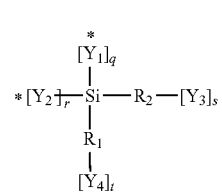
[Formula 2]

wherein $Y_1$ to $Y_4$ are the same or different from each other, and each represent a halogen element, q to t are each an integer of 0 or 1, provided that at least one of q to t is an integer of 1, $R_1$ is a C1 to C4 alkyl group, $R_2$ is a C1 to C10 alkyl group, and

* is a moiety of a multifunctional group that may be bound to a vinyl aromatic hydrocarbon block or conjugated diene block unit in the vinyl aromatic hydrocarbon-conjugated diene block copolymer, where one and two molecules of the vinyl aromatic hydrocarbon-conjugated diene block copolymer may be bound to one molecule of the multifunctional group.

According the present invention, the vinyl aromatic hydrocarbon block may have a structure derived from a vinyl group-containing C6 to C30 aromatic hydrocarbon-based compound. For example, the vinyl aromatic hydrocarbon block may include at least one selected from the group consisting of styrene, α-methylstyrene, 3-methylstyrene, 4-methylstyrene, 4-propylstyrene, 4-cyclohexylstyrene, and 4-(para-methylphenyl)styrene.

The conjugated diene block may have a structure derived from a butadiene-based compound. For example, the conjugated diene block may include at least one selected from the group consisting of 1,3-butadiene, 2,3-dimethyl-1,3-butadiene, and 2-phenyl-1,3-butadiene.

More preferably, styrene or methylstyrene may be used as the vinyl aromatic hydrocarbon alone or in combination thereof, and butadiene or isoprene may be used as the conjugated diene alone or in combination thereof.

In this case, the vinyl aromatic hydrocarbon block and the conjugated diene block may be present at a weight ratio of 1:1 to 1:4. When the weight ratio is included within this range, the vinyl aromatic hydrocarbon block and the conjugated diene block may be stably dissolved in the asphalt composition, thereby achieving a sufficient modification effect. When the content of the vinyl aromatic hydrocarbon is less than this content range, physical properties of asphalt may be degraded because the vinyl aromatic hydrocarbon block does not easily form a physical cross-linking point. On the other hand, when the content of the vinyl aromatic hydrocarbon is greater than this content range, solubility in asphalt may be poor, and low-temperature properties may be degraded.

Also, the block copolymer represented by a [A-B-C] block may have a weight average molecular weight of 30,000 to 500,000 g/mol, preferably 35,000 to 300,000 g/mol, and may be linear, branched, or a combination thereof. When the molecular weight of the vinyl aromatic hydrocarbon-conjugated diene block copolymer is less than this range, high-temperature properties may be degraded due to a very low molecular weight of the vinyl aromatic hydrocarbon block. On the other hand, when the molecular weight of the vinyl aromatic hydrocarbon-conjugated diene block copolymer is greater than this range, solubility in asphalt may be severely poor.

In this case, a linear, branched, symmetric, asymmetric, or radial styrene-butadiene-styrene (SBS), styrene-isoprene-styrene (SIS), or styrene-butadiene (SB) diblock copolymer may be used as the block copolymer represented by the [A-B-C] block. The block copolymers may be used alone or in combination of two or more. More preferably, styrene-butadiene-styrene (SBS) is used.

In particular, the asphalt modifier according to the present invention includes the multifunctional group X represented by Formula 2 bound to a main chain of the vinyl aromatic hydrocarbon-conjugated diene block copolymer.

The multifunctional group X is derived from a coupling agent. Specifically, the multifunctional group X may be formed by a reaction of a coupling agent and a vinyl aromatic hydrocarbon-conjugated diene block copolymer, which may be used as the asphalt modifier, in the presence of an organic metal compound or a living anion that is a polymer chain having an anionic end initiated from a polymerization initiator. In particular, a reaction of the asphalt modifier with a polar group present in asphalt is promoted under a high-temperature condition by introducing the multifunctional group X represented by Formula 2 into the main chain of the vinyl aromatic hydrocarbon-conjugated diene block copolymer. According to this, the asphalt modifier of the present invention serves to enhance compatibility with the asphalt composition. Also, because the asphalt modifier is uniformly mixed in the asphalt composition, an effect of improving the physical properties of the asphalt composition by addition of the asphalt modifier may be sufficiently achieved.

X is represented by Formula 2, where the alkyl group of $R_1$ in Formula 2 is methyl, ethyl, propyl, isopropyl, or butyl, preferably methyl.

Also, the alkyl group of $R_2$ may be a C1 to C10 linear or branched alkyl group, preferably a linear alkyl group such as methyl, ethyl, propyl, butyl, pentyl, hexyl, heptyl, octyl, nonyl, decenyl, or the like. More preferably, the alkyl group of $R_2$ may be propyl or butyl. Also, when t is 1, the alkyl group of $R_2$ may be in the form of an alkylene group from which one hydrogen atom is excluded.

When such a functional group has a structural difference to dichlorodimethylsilane (DMDCS) often used as a conventional coupling agent, $R_2$ in the functional group X contains an alkyl group having one or more carbon atoms, preferably 3 or more carbon atoms, compared to DMDCS containing only a methyl group.

In particular, in the asphalt modifier of the present invention, the halogenated alkyl group serves to enhance reactivity of the asphalt modifier of Formula 1 with a polar group of asphalt via X. Therefore, X has at least one halogenated alkyl group to impart high reactivity with the polar group of asphalt, compared the DMDCS in which only two methyl groups are present, which has been used as the conventional coupling agent. On the other hand, the multifunctional group X exhibits superior compatibility, compared to the DMDCS having low reactivity with the polar group of asphalt. Such compatibility also results in increased solubility. Solubility characteristics may be determined by a phase separation test. Referring to Table 1 to be described below, it can be seen that a significant increase in solubility may be achieved, compared to the use of the asphalt modifier modified with DMDCS.

In the asphalt modifier of the present invention, a content of the multifunctional group X may be in a range of 40 to 4,700 ppm, preferably in a range of 100 to 3,500 ppm, based on the total weight 1 of the vinyl aromatic hydrocarbon-conjugated diene block copolymer. When the content of the multifunctional group is included within this range, compatibility with asphalt may be enhanced, and the physical properties, such as an operating temperature range, lifespan, and the like, of the asphalt containing the multifunctional group may be improved.

Also, the present invention provides a method of preparing the aforementioned asphalt modifier.

The method of preparing an asphalt modifier according to the present invention includes preparing a vinyl aromatic hydrocarbon block by polymerizing a vinyl aromatic hydrocarbon-based monomer in a hydrocarbon-based solvent using a polymerization initiator; preparing a vinyl aromatic hydrocarbon-conjugated diene block copolymer by mixing a polymerization initiator and a conjugated diene monomer with the vinyl aromatic hydrocarbon block and polymerizing the resulting mixture; and coupling a multifunctional group to the vinyl aromatic hydrocarbon-conjugated diene block copolymer by mixing a coupling agent with the vinyl aromatic hydrocarbon-conjugated diene block copolymer.

Hereinafter, respective steps of the method will be described in detail.

First, a vinyl aromatic hydrocarbon block is prepared by polymerizing a vinyl aromatic hydrocarbon-based monomer in a hydrocarbon-based solvent using a polymerization initiator.

As described above, the vinyl aromatic hydrocarbon-based monomer may include a vinyl group-containing C6 to C30 aromatic hydrocarbon-based compound. The vinyl aromatic hydrocarbon-based monomer may be used at a proper amount in consideration of the content of the vinyl aromatic hydrocarbon block in the finally prepared vinyl aromatic hydrocarbon-conjugated diene block copolymer.

The hydrocarbon-based solvent does not react with a polymerization initiator to be described below. In this case, types of the hydrocarbon-based solvent may be used without particular limitation as long as they are generally used for a polymerization reaction. For example, the hydrocarbon-based solvent may include at least one selected from the group consisting of linear or branched hydrocarbon compounds such as butane, n-pentane, n-hexane, n-heptane, isooctane, and the like; alkyl-substituted or unsubstituted cyclic hydrocarbon compounds such as cyclopentane, cyclohexane, cycloheptane, methyl cyclohexane, methyl cycloheptane, and the like; and alkyl-substituted or unsubstituted aromatic hydrocarbon compounds such as benzene, toluene, xylene, naphthalene, and the like.

Also, the hydrocarbon solvent may further include a polar solvent to adjust a content of vinyl during polymerization of the conjugated diene monomer and enhance a polymerization rate. For example, the polar solvent may include one or more selected from the group consisting of tetrahydrofuran, ethyl ether, tetramethylethylene diamine, and benzofuran.

The polymerization initiator may be used without particular limitation as long as they may be generally used for anionic polymerization.

The polymerization initiator may be an organic metal compound or a living anion that is a polymer chain having an anionic end initiated from the polymerization initiator.

The organic metal compound may be an organic lithium compound represented by the following Formula 3:

$$R_3-Li \quad \text{[Formula 3]}$$

wherein $R_3$ is a C1 to C20 aliphatic, alicyclic, alkyl-substituted alicyclic, aromatic, or alkyl-substituted aromatic hydrocarbon group.

For example, the organic metal compound may include at least one selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium.

Next, a vinyl aromatic hydrocarbon-conjugated diene block copolymer is prepared by mixing a polymerization initiator and a conjugated diene monomer with the vinyl aromatic hydrocarbon block and polymerizing the resulting mixture.

As described above, the conjugated diene monomer may be a butadiene-based compound. The conjugated diene monomer may be used at a proper amount in consideration of the content of the conjugated diene block in the finally prepared vinyl aromatic hydrocarbon-conjugated diene block copolymer.

Like the aforementioned step, the polymerization of the conjugated diene may also be performed through an anionic polymerization reaction. Therefore, the polymerization initiator is as described above.

In the aforementioned two-step polymerization reaction, the polymerization initiator may be included at a content of 0.3 to 3.3 mmol, based on the total content of the vinyl aromatic hydrocarbon-conjugated diene block copolymer. When the content of the polymerization initiator is less than this content range, stirring efficiency of a reactor may be declined due to an excessive increase in molecular weight of the block copolymer, and thus a reaction with a coupling agent to be described below does not easily occur, which makes it difficult to introduce a multifunctional group. On the other hand, when the content of the polymerization initiator is greater than this content range, productivity may be severely lowered in subsequent processes.

The polymerization reaction is preferably performed at 0 to 150° C. in a pressure range (0.1 to 10 bar), in which a reaction product may be maintained in a liquid phase, until a consumption rate of the conjugated diene monomer reaches 99% or more.

Also, the vinyl aromatic hydrocarbon-conjugated diene block copolymer in which the aforementioned vinyl aromatic hydrocarbon block and conjugated diene block are alternately aligned is prepared through the polymerization reaction. In this case, at least one of the A to C blocks in Formula 1 preferably includes the vinyl aromatic hydrocarbon block.

Then, the multifunctional group is coupled to the vinyl aromatic hydrocarbon-conjugated diene block copolymer by mixing a coupling agent with the vinyl aromatic hydrocarbon-conjugated diene block copolymer.

The coupling reaction is carried out by introducing the multifunctional group X represented by Formula 2 into the main chain of the vinyl aromatic hydrocarbon-conjugated diene block copolymer represented by Formula 1, and simultaneously connecting conjugated diene blocks between the block copolymers.

In this case, the coupling agent may be a compound represented by the following Formula 4:

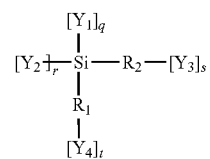

[Formula 4]

wherein $Y_1$ to $Y_4$, $R_1$ and $R_2$, and q to t are as described above.

More specifically, the coupling agent may include (2-chloroethyl)methyl dichlorosilane (1), (3-chloropropyl)methyl dichlorosilane (2), (4-chlorobutyl)methyl dichlorosilane (3), (3-chloropropyl)propyl dichlorosilane (4), bis(3-chloropropyl) dichlorosilane (5), and dichloro(chloromethyl) methylsilane (6), which are represented by the following formulas, respectively. Preferably, 3-chloropropylmethyl dichlorosilane is used.

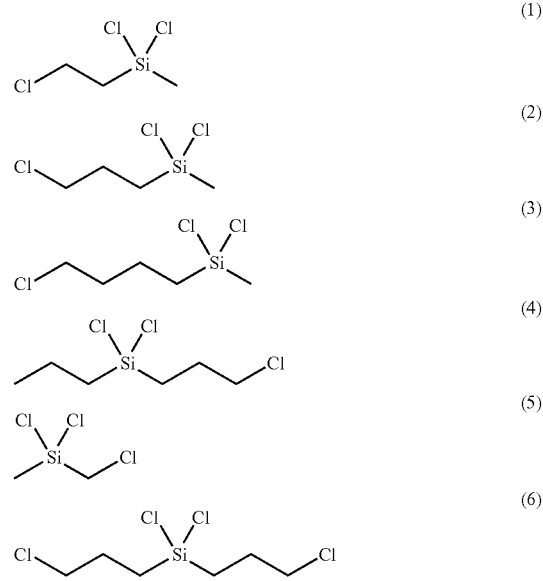

Specifically, the coupling agent may be used at a content of 40 ppm to 4,700 ppm in a fourth mixed solution.

The aforementioned coupling agent may react with an anionic active site of an end of a second conjugated diene block in the vinyl aromatic hydrocarbon-first conjugated diene-second conjugated diene triblock copolymer prepared in step 3 to connect the conjugated diene blocks between the block copolymers, and may simultaneously perform a functionalization reaction.

As a result of the aforementioned coupling reaction, the vinyl aromatic hydrocarbon-conjugated diene block copolymer of Formula 1 is prepared. In this case, the aromatic hydrocarbon-conjugated diene block copolymer of Formula 3, which is not subjected to the coupling reaction, may be present in a state in which the block copolymer is mixed with the product obtained as a result of the coupling reaction.

Also, the method of preparing an asphalt modifier according to one embodiment of the present invention may optionally further include adding a polymerization terminator such as water or an alcohol into a reactor after the coupling reaction to remove the activity of an active polymer.

Further, the present invention provides a modified asphalt composition including the asphalt modifier represented by Formula 1, asphalt, and a cross-linking agent.

Asphalt is obtained as a residue when crude oil is refined, mainly consists of hydrogen and carbon atoms, and includes a hydrocarbon compound to which a small amount of nitrogen, sulfur, or oxygen atoms are bound. The asphalt includes straight asphalt, cutback asphalt, guss asphalt, blown asphalt, emulsified asphalt, PG-grade asphalt, and the like.

The straight asphalt is a final residual fraction that is obtained by distilling a crude oil in a crude distillation unit (CDU) and re-distilling an atmospheric residue (AR) under reduced pressure, and thus contains a large amount of undecomposed bituminous substances. Thus, the straight asphalt may be used as various petroleum-based asphalt sources. Commercially available straight asphalt includes AP-3, AP-5, and the like, all of which are provided by SK Energy Co., Ltd. or GS Caltex Corp.

In the present invention, the copolymer represented by Formula 1 is used as the asphalt modifier to improve solubility of asphalt.

Specifically, the modified asphalt composition provided in the present invention may include 1 to 10 parts by weight of the asphalt modifier, 87 to 98.95 parts by weight of the asphalt, and 0.05 to 3 parts by weight of the cross-linking agent.

Within the above ranges, excellent storage stability of the asphalt composition may be secured. When the content of the asphalt modifier is greater than this content range, an increase in manufacturing costs of the modified asphalt composition may be caused. When the content of the cross-linking agent is greater than this content range, elasticity of modified asphalt may be lost due to an excessive cross-linking reaction, and the modified asphalt may be gelled. On the other hand, when the content of each of the asphalt modifier and the cross-linking agent is less than this content range, high-temperature properties and elasticity of the modified asphalt may be deteriorated due to a low degree of asphalt modification.

In this case, the asphalt may include 1 to 40% by weight, specifically 5 to 30% by weight of asphaltene, based on the total content of the asphalt.

According to the present invention, the asphalt modifier of Formula 1, the cross-linking agent, and the asphalt are mixed with asphalt using a high-speed shear mixer to obtain a modified asphalt composition.

The cross-linking agent is not particularly limited as long as the cross-linking agent is a sulfur compound containing sulfur or iron sulfate. For example, a representative example of the sulfur compound may be a sulfur element.

When the asphalt composition includes approximately 4 to 5% by weight of the modifier under a vulcanization condition, the asphalt composition preferably has a melting rate of 1 to 10 hours, more preferably a melting rate of 1 to 8 hours within this weight range. That is, the balance of the physical properties of the asphalt composition may be effectively made within this range.

A procedure of blending the modified asphalt composition is as follows. First, asphalt is put into a 1 L heating mantle, and kept at a temperature of 150 to 170° C., preferably 160 to 165° C. for 30 minutes to 2 hours, preferably 40 minutes or more. When the asphalt is sufficiently melted, the aforementioned asphalt modifier of Formula 1 is added to the asphalt while slowly increasing a stirring rate. While a rotary speed of the high-speed shear mixer is maintained at 2,500 rpm, the resulting mixture is stirred for 30 to 2 hours, preferably 1 hour by controlling a temperature of 180 to 195° C., preferably 190° C. Thereafter, the mixture is transferred to an impeller-type agitator, and stirred at the same temperature for another 5 hours or more, preferably 6 to 8 hours while the rotary speed of the high-speed shear mixer is maintained at 250 rpm. Then, the modified asphalt composition is sampled at points of time to measure physical properties. Also, the modified asphalt composition thus prepared is sampled by blending times, and added to aluminum tubes, which are stored for a predetermined time in a 180° C. oven. Then, the solubility is determined as a difference in softening point between an upper bed and a lower bed of each of the aluminum tubes.

The modified asphalt composition of the present invention may have a softening point of 65° C., an elongation of 20 cm or more, and a viscosity of 3,000 cPs or less. In this case, the elongation and viscosity are not limited to any certain ranges. For example, the elongation is greater than or equal to 20 cm because the higher the elongation is, the better it is. The viscosity is less than or equal to 3,000 cPs because the lower the viscosity is, the more desirable it is. For example, the elongation may be in a range of 20 cm to 80 cm, and the viscosity may be in a range of 300 cPs to 3,000 cPs, but the present invention is not limited thereto.

MODE FOR INVENTION

Hereinafter, examples of the present invention will be described in detail so that a person having ordinary skill in the art to which the present invention belongs can easily put the present invention into practice. However, it should be understood that the present invention can be implemented in various different forms, and is not limited to the embodiments disclosed below.

Example 1: Preparation of Asphalt Modifier and Asphalt Composition (1) Preparation of Asphalt Modifier 4.286 g of purified cyclohexane and 273 g of styrene were put into a 10 L reactor whose atmosphere was replaced with nitrogen, and warmed to 60° C. while stirring. Thereafter, 1.137 g of n-butyllithium was added to the mixed solution of cyclohexane and styrene at 60° C. to polymerize a styrene block. Then, 607.5 g of butadiene was added thereto, and polymerized until the butadiene was completely consumed.

After the polymerization reaction was completed, 2.213 g of 3-chloropropylmethyl dichlorosilane (CPMDS) as a coupling agent was added thereto, and a coupling reaction was then performed to prepare a polymer in which the chloropropylmethyl dichlorosilane was substituted with a terminal butadiene group.

Subsequently, 0.2 g of water as a reaction terminator was added to the mixed solution to remove reaction activity. Thereafter, 6.16 g of a solution obtained by mixing first and second antioxidants with the mixed solution was added to a polymerization solution to prepare a linear styrene-butadiene block copolymer having a weight average molecular weight of approximately 110 kg/mol and a styrene block content of 31% by weight.

In this case, the weight average molecular weight was measured by dissolving each polymer pellet sample in tetrahydrofuran (THF) for 30 minutes, loading the sample onto gel permeation chromatography (GPC, Waters Corp.) to flow therethrough, and comparing a molecular weight of the sample with a reference molecular weight of a polystyrene (PS) standard.

Next, a stripping process was generally performed to recover only the polymer from the reaction solution. Specifically, 0.7 g of Tamol (BASF) as a dispersing agent, and 0.5 g of CaCl$_2$ were added to 3 L of water, and boiled. Then, the polymer solution was slowly added to the boiling water so that the polymer was aggregated in water. Thereafter, the aggregated polymer was dispersed with a size of 1 to 20 mm in water, and then recovered by evaporating the solvent. The recovered polymer was dried for 16 hours in a 60° C. oven to prepare a functionalized styrene-butadiene block copolymer pellet.

(2) Preparation of Asphalt Composition 500 g of asphalt (AP3, SK Corp.) was added to a heating mantle, and each of the asphalt modifiers thus prepared was added in an amount of 4.8% by weight based on the total weight of the asphalt composition while stirring at a high shear rate of 2,500 rpm at 190° C.

After an hour, 0.53 g of sulfur as a cross-linking agent was added thereof, and stirred at a low shear rate of 200 rpm. In this case, while the resulting mixture was observed under a fluorescence microscope, the mixture was stirred until an SBS copolymer was dissolved, thereby to prepare an asphalt composition.

Example 2: Preparation of Asphalt Modifier and Asphalt Composition

An asphalt modifier and an asphalt composition were prepared in the same manner as in Example 1, except that bis(3-chloropropyl) dichlorosilane was used as the coupling agent instead of the CPMDS.

Example 3: Preparation of Asphalt Modifier and Asphalt Composition

An asphalt modifier and an asphalt composition were prepared in the same manner as in Example 1, except that dichloro(chloromethyl) methylsilane was used as the coupling agent instead of the CPMDS.

Comparative Example 1: Preparation of Asphalt Modifier and Asphalt Composition An asphalt modifier and an asphalt composition were prepared in the same manner as in Example 1, except that dichlorodimethylsilane (DMDCS) was used as the coupling agent instead of the CPMDS.

Experimental Example 1: Evaluation of Physical Properties of Asphalt Compositions The physical properties of the modified asphalt composition including each of the asphalt modifiers prepared in Examples and Comparative Example were measured, as follows. The results are listed in the following Table 1.

(1) Softening Point

The softening point is a measure of high-temperature properties of the modified asphalt measured according to the American Society for Testing and Materials (ASTM) D36. Here, the softening point was measured by heating water or glycerin at a rate of 5° C./minute so that a specimen began to soften by the heating, followed by measuring a temperature when a ball having a diameter of 9.525 mm and a weight of 3.5 g, which had been disposed on the specimen, moved down by approximately 1 inch.

(2) Phase Separation Temperature 50 g of the modified asphalt composition was weighed in an aluminum tube, and kept for 72 hours in a 180° C. oven. Thereafter, the asphalt composition was divided into three equal parts, and softening points of the top and bottom parts were then measured according to the ASTM D36 method. Then, a temperature difference between the top and bottom parts was calculated.

(3) Viscosity

The viscosity was measured at 135° C., 160° C. and 180° C. according to ASTM D4402 under the conditions of Spindle #27 using Brookfield DV-II+ Pro Model.

(4) Elastic Recovery Rate

The elastic recovery rate was measured according to ASTM D6083-97 after a specimen is kept at 25° C. for an hour.

TABLE 1

| Items | Stirring time (hour) | Example 1 | Example 2 | Example 3 | Comparative Example 1 |
|---|---|---|---|---|---|
| Softening point (° C.) | 6 | 86.1 | 86.3 | 86.9 | 88.0 |
|  | 7 | 85.3 | 85.3 | 86.2 | 87.2 |
|  | 8 | 84.2 | 83.5 | 85.2 | 86.5 |
| Phase separation temperature (ΔT, ° C.) | 6 | 5.0 | 5.5 | 5.0 | 23.3 |
|  | 7 | 1.3 | 0.9 | 1.8 | 8.5 |
|  | 8 | 0.2 | 1.0 | 1.2 | 2.9 |
| Viscosity (cps) | 8   135° C. | 1865 | 1830 | 1810 | 1860 |
|  | 160° C. | 630 | 625 | 615 | 665 |
|  | 180° C. | 320 | 310 | 315 | 335 |
| Elastic recovery rate (%) at 25° C. |  | 94.8 | 95.8 | 94.5 | 96.0 |

As listed in Table 1, it can be seen that the asphalt modifier had remarkably improved solubility in the asphalt composition because the modified asphalt composition including the asphalt modifier according to the present invention had a very low phase separation temperature without degrading the basic physical properties of modified asphalt, such as a softening point, viscosity, elongation, and an elastic recovery rate, compared to the modified asphalt composition of Comparative Example 1.

Also, it can be seen that the manufacturing time of the modified asphalt composition of Example 1 including the styrene butadiene block copolymer into which a certain multifunctional group was introduced according to the present invention was shortened by approximately 1 to 1.5 hours, compared to the modified asphalt composition of Comparative Example 1.

Generally, it is contemplated that phase separation does not occur when the phase separation temperature is less than or equal to 2.5° C. Thus, it can be seen that the asphalt modifier was completely dissolved in the asphalt composition because the phase separation temperatures in Examples were in a range of 0.2 to 1.5° C. when the stirring times were 7 hours and 8 hours. From the results, it can be seen that the modified asphalt composition had excellent storage stability.

INDUSTRIAL APPLICABILITY

The asphalt modifier of the present invention has excellent compatibility with the asphalt composition, and thus the asphalt composition having excellent low-temperature and high-temperature properties, storage stability, and modification workability can be provided.

The invention claimed is:

1. An asphalt modifier comprising a multifunctional group bound to a main chain of a vinyl aromatic hydrocarbon-conjugated diene block copolymer represented by the following Formula 1:

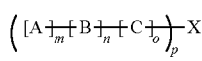   [Formula 1]

wherein A to C blocks are each independently a vinyl aromatic hydrocarbon block or a conjugated diene block, m, n, and o are each an integer greater than or equal to 1, p is an integer in a range of 0<p≤3, and a multifunctional group X is derived from a coupling agent, wherein the coupling agent comprises at least one of (2-chloroethyl)methyl dichlorosilane, (3-chloropropyl)methyl dichlorosilane, (4-chlorobutyl)methyl dichlorosilane, (3-chloropropyl)propyl dichlorosilane, bis(3-chloropropyl) dichlorosilane, or dichloro(chloromethyl) methylsilane.

2. The asphalt modifier according to claim 1, wherein the vinyl aromatic hydrocarbon block comprises at least one selected from the group consisting of styrene, α-methylstyrene, 3-methylstyrene, 4-methylstyrene, 4-propylstyrene, 4-cyclohexylstyrene, and 4-(para-methylphenyl) styrene.

3. The asphalt modifier according to claim 1, wherein the conjugated diene block comprises at least one selected from the group consisting of 1,3-butadiene, 2,3-dimethyl-1,3-butadiene, and 2-phenyl-1,3-butadiene.

4. The asphalt modifier according to claim 1, wherein X is included at an amount of 40 to 4,700 ppm, based on the total weight 1 of the block copolymer.

5. The asphalt modifier according to claim 1, wherein the block copolymer has a weight average molecular weight of 30,000 to 500,000 g/mol.

6. A method of preparing an asphalt modifier of claim 1, comprising:

preparing a vinyl aromatic hydrocarbon block by polymerizing a vinyl aromatic hydrocarbon-based monomer in a hydrocarbon-based solvent using a polymerization initiator;

preparing a vinyl aromatic hydrocarbon-conjugated diene block copolymer by mixing a polymerization initiator and a conjugated diene monomer with the vinyl aromatic hydrocarbon block and polymerizing the resulting mixture; and performing a coupling reaction by mixing a coupling agent with the vinyl aromatic hydrocarbon-conjugated diene block copolymer, wherein the coupling agent comprises (2-chloroethyl) methyl dichlorosilane, (3-chloropropyl)methyl dichlorosilane, (4-chlorobutyl)methyl dichlorosilane, (3-chloropropyl)propyl dichlorosilane, bis(3-chloropropyl) dichlorosilane, or dichloro(chloromethyl) methylsilane.

7. An asphalt composition comprising asphalt, a crosslinking agent, and an asphalt modifier, wherein the asphalt modifier is the asphalt modifier of claim 1.

* * * * *